US008463744B2

(12) United States Patent
Hansmann et al.

(10) Patent No.: US 8,463,744 B2
(45) Date of Patent: Jun. 11, 2013

(54) METHOD AND SYSTEM FOR SYNCHRONIZING DATA

(75) Inventors: Uwe Hansmann, Altdorf (DE); Lothar Merk, Weil i.Schoenbuch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 2480 days.

(21) Appl. No.: 10/037,700

(22) Filed: Jan. 2, 2002

(65) Prior Publication Data

US 2002/0087556 A1 Jul. 4, 2002

(30) Foreign Application Priority Data

Jan. 3, 2001 (EP) .................................... 01100246

(51) Int. Cl.
*G06F 17/00* (2006.01)

(52) U.S. Cl.
USPC ........... 707/617; 707/611; 707/612; 707/620; 707/656

(58) Field of Classification Search
USPC ................ 707/100, 102, 204, 611, 612, 617, 707/620, 656, 680; 717/122, 110
See application file for complete search history.

(56) References Cited

U.S. PATENT DOCUMENTS

| | | | | |
|---|---|---|---|---|
| 5,684,990 | A | 11/1997 | Boothby | |
| 5,870,759 | A * | 2/1999 | Bauer et al. | 1/1 |
| 5,878,434 | A * | 3/1999 | Draper et al. | 1/1 |
| 5,974,238 | A | 10/1999 | Chase, Jr. | |
| 6,234,544 | B1 * | 5/2001 | Bartholomew | 285/319 |
| 6,321,544 | B1 * | 11/2001 | Kanai et al. | 62/126 |
| 6,591,272 | B1 * | 7/2003 | Williams | 707/102 |
| 6,681,382 | B1 * | 1/2004 | Kakumani et al. | 717/122 |
| 2002/0194388 | A1 * | 12/2002 | Boloker et al. | 709/310 |

* cited by examiner

*Primary Examiner* — Sana Al Hashemi
(74) *Attorney, Agent, or Firm* — Sawyer Law Group, P.C.

(57) ABSTRACT

A method and system for synchronizing data records in a client with data records in a server system is disclosed. The method and system of the present invention includes creating setup information in the client and providing the same to the server, wherein the setup information enables the server system to identify the client, to identify where to find information the server system needs for synchronization, and to provide appropriate commands for the client.

8 Claims, 2 Drawing Sheets

100

METHOD AND SYSTEM FOR SYNCHRONIZING DATA

CROSS-REFERENCE TO RELATED APPLICATIONS

This application claims benefit under 35 U.S.C. §119 of European Application No. 01100246.6, filed on Jan. 3, 2001.

FIELD OF THE INVENTION

The present invention in general relates to the sharing of data between a plurality of databases. More specifically, the invention relates to the synchronization of such data. Still more specifically, the invention pertains to the synchronization of data between a server system and a mobile client.

BACKGROUND OF THE INVENTION

The rapid acceptance of computer technology by corporations as well as consumers has led to the widespread use of computers. Further abetting this process is the continual reduction in size and cost of personal computers. Originally, personal computers were large items best suited for floor standing or desktop use. Eventually, they became smaller so that desktop use became the standard. Improvements in processor, memory and data storage capabilities have resulted in light weight, powerful mobile computers such as portables, laptops, notebooks, palm top and personal digital assistants. These computers can provide sufficient processing capability for audio visual applications, such as computer aided design, three dimensional animation, and multimedia presentation, even when used at remote locations.

Typically, many users of such mobile computers also own desktop computers used for applications that manage databases similar to the databases carried in mobile computers. Normally, the user adds data to the two computers independently, e.g., one enters data into the mobile computer, often referred to as a client, when out at a customer site but enters data into the desktop computer or a network server when in the office. In such cases, the user normally would at some point want to keep these two sets of data identical, especially if different changes are made in parallel to both devices. This action is called data synchronization.

FIG. 1 illustrates a block diagram of a client/server system for data synchronization. As is shown, the client 10 includes a database 12, which ideally is in sync with a server database 22 at the server 20. Typically, the client 10 requires a client database adapter 14, which is a large piece of software, installed to retrieve and add data during a synchronization. The data is exchanged in a format that the client 10 and server 20 are both able to generate and to parse. The client 10 needs to create and to parse the document 19 which requires a certain amount of code on the client 10 device. Especially with today's mobile clients 10, like mobile phones or small handheld computers, the resources available are very limited. Adding flash memory to the mobile clients is an option, but a very costly one.

A client 10 that wants to synchronize its data with the data of a server 20 also needs a local client sync engine 16 that retrieves the adds, changes, updates, etc. from the client's database 12 and creates a standardized document 19 to tell the server 20 which data has been added, deleted, etc., on the client's side 10. The server 20 parses this document 19 and updates the server (or host) database 22 accordingly. The server 20 also checks the host database 22 for changes which might have taken place since the last synchronization cycle with the respective client 10, retrieves these records and builds the exchange document 19. The client 10 will receive this document 19 and now needs to parse it to know what to do.

Thus today, a client 10 needs at least the following three components shown in FIG. 1 to synchronize data with a server 20: a client database adapter 14, a sync client agent 16 and a client sync adapter 18. The sync adapter 18 contains an encoder and a parser (not shown) to generate and understand the standardized exchange document 19.

One Industry Data Synchronization Standard is SyncML. SyncML includes a universal data synchronization format that is defined by an Extensible Markup Language (XML) document type, XML being a standard format for interchanging structured documents. This format is exchanged as SyncML messages between network devices. A SyncML message is just an XML document. SyncML is independent from the underlying transport layer and can be used in wireless as well as in wired environments.

Unlike HTML, XML enables the creation of user defined tags. Traditional HTML tags are extended by user defined elements. Like in HTML, the start and end of each logical block is marked by the appropriate tags. Document Type Definitions (DTD) are an important element of XML. They define the role of text elements in a formal model. The DTD can be used to check if an XML document contains valid tags and if the tags occur in the right place within the document. It also specifies the attributes that belong to an element and the valid values of these attributes. Thus, DTDs have two main functions:

1) specifying which document structures can be used by the author of an XML document and which document structures have to be handled by the generator that creates that defined kind of XML document; and
2) specifying which document structures have to be handled by parsers that process that defined kind of XML document.

In Standard Generalized Markup Language (SGML), of which XML is a subset, the use of DTDs is required. However, XML does not require the use of a DTD. A parser that processes a document without a DTD has to extract the relevant information from the document itself.

The statement that XML is "extensible" can be misunderstood. XML defines a syntax, in the form of a number of rules in order to define document structures. These rules are defined in the XML specification and cannot be extended. "Extensible" means that special instances of tag languages can be built on the fundamental rules of XML.

The basic concept of XML is the composition of documents using a series of entities. The entities themselves are composed of one or more logical elements. The elements can contain attributes which describe the way in which the elements have to be processed.

In addition, SyncML defines a synchronization protocol. This protocol specifies how SyncML conformant messages are exchanged to synchronize databases on different network devices. The synchronization protocol supports both one-way, as well as two-way data synchronization. The SyncML specifications also define HTTP, OBEX, and WSP transport bindings, which describe the minimum set of features that a SyncML compliant transport implementation must support.

In U.S. Pat. No. 5,974,238, an apparatus for performing dynamic synchronization between data stored in a handheld computer and a host computer is disclosed. Each computer includes a plurality of data sets including at least one common data set, and each computer includes a copy of the common data set. The handheld computer comprises a data synchronization engine having a pseudo-cache and one or more tags connected to the pseudo cache. Data is synchronized whenever data is written to main memory and/or when the associated pseudo-cache tag is invalidated. By strict adherence to a set of protocols, data coherency is achieved because the system always knows who owns the data, who has a copy of the data, and who has modified the data. A data synchronization engine resolves any differences in the copies and allows the storage of identical copies of the common data set in the host computer and in the handheld computer.

In U.S. Pat. No. 5,684,990, a data processing method for synchronizing the data records of a plurality of disparate databases is disclosed, in which a status file is provided containing data records representative of the contents of data records existing in the disparate databases at a prior synchronization. Data records from at least a first and a second of the plurality of databases are compared to corresponding data records of the status file to determine whether data records of the plurality of databases have changed or been deleted since the prior synchronization, or whether there are new data records since the earlier synchronization. Based on the outcome of the comparing step, decisions are made as to how to update the data records of the first and second databases. Finally, the status file is updated so that its data records are representative of the contents of the data records of the first and second databases after they have been updated.

These synchronization systems possess at least one disadvantage in that they do not take into account that mobile clients like mobile phones, have very restricted storage capacity. The components necessary for the systems according to the state of the art require a lot of storage capacity on the side of the client device. In addition, a fixed protocol and document format is used that the client needs to convert the data to and from.

Thus, there exists a need for a method and system for synchronizing data between a server and a client that reduces the amount of code needed on a client to synchronize data with the server system. There is also a need for a method and system for synchronizing data that allows the client to send data to the server system in a format most suitable for the client device, and frees the client device from having to parse the exchange document. The present invention addresses these needs.

SUMMARY OF THE INVENTION

The present invention discloses a method and system for minimizing code needed in a client to synchronize data records in the client with data records in a server system. The method and system of the present invention includes creating setup information in the client and providing the same to the server, wherein the setup information enables the server system to identify the client and to provide appropriate commands for the client.

Through aspects of the method and system of the present invention, the client detects and dumps a changed record in the client database, and transmits the changed record, as it existed in the client database, to the server. At the server, the server is able to interpret the changed record based on the setup information, and the server updates its database. Then, again using the setup information, the server compiles a program to update the client database, and transmits the program to the client, where it is executed to update and synchronize the client database.

According to the method and system of the present invention, the amount of software required for synchronization in the client is dramatically reduced because the client is no longer required to construct a standardized document comprehendible by the server system. Moreover, the client is able to execute the program compiled by the server system without additional interpretive code. This makes it possible to offer less expensive client devices with less memory, or allows the client device to utilize available memory for alternative applications. The method and system of the present invention, in essence, transfers the synchronization workload from the client to the server, which is better adapted and equipped to handle such a load.

DETAILED DESCRIPTION

The present invention relates to synchronizing data between a client database and a server database. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

In accordance with a preferred embodiment of the present invention, the amount of code needed on a client 10 to synchronize data with a server system 20 is reduced by providing setup information from the client 10 to the server 20 at the time the server 20 and the client 10 first synchronize a certain database 12, 22. By providing such setup information, the server 20 is able to understand the data from the client 10, and to know how to build proper and appropriate client commands.

The setup information provided by the client 10 tells the server 20 where to find in a data block the information the server 20 needs. For example, if the database is an address book, the data block would include a person's name, street address, ZIP-code, and contact number, as defined in a vcard specification. In one preferred embodiment, the setup information is provided in a header information, such as the following:

<Internal structure of the document>, e.g., fixed records, TLV, . . .
total block length: 80
name: 1-19
street address: 20-44
ZIPcode: 45-59
Contact number: 60-75

In addition, the header information may include some information as to the kind of client that has sent the respective information.

The client 10 sends setup information to the server 20 to enable the server 20 to identify the client 10 and to select the correct method to generate client commands that are executable by the client 10. In another embodiment, the client 10 transmits setup information to the server 20 as to how to generate proper client commands in a way that the client 10 just needs to execute the commands the server 20 sends. Each command, e.g., "ADD", "DELETE", "UPDATE", is preferably defined in the setup information transmitted to the server 20.

Figure 1:
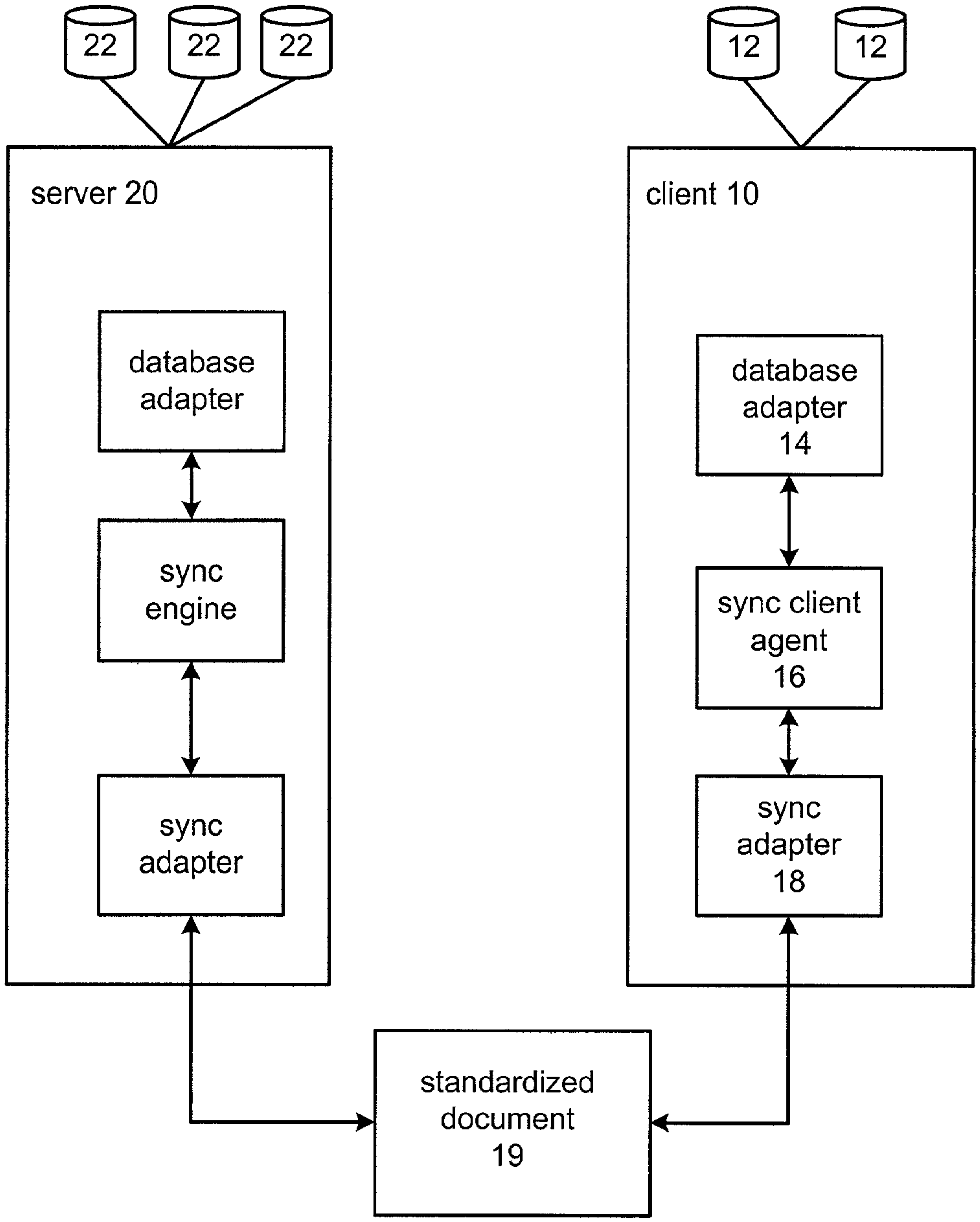
FIG. 1 is a block diagram illustrating client and server systems which are equipped for synchronization.
Figure 2:
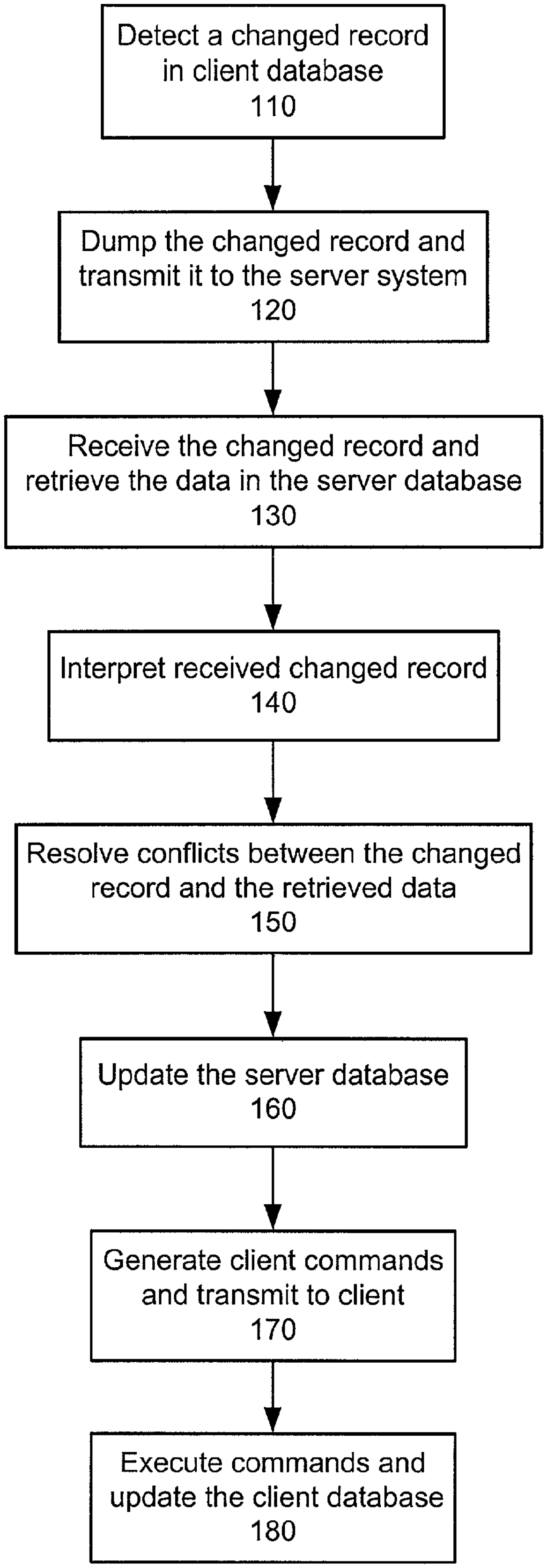
FIG. 2 is a flowchart illustrating a process according to a preferred embodiment of the present invention.

After the setup information has been transmitted, then synchronization can take place. FIG. 2, illustrates a flowchart showing a synchronization process according to a preferred embodiment of the present invention after the setup information has been transmitted. While the process describes a client initiated synchronization, one skilled in the art would appreciate that the process is also applicable in case of a server initiated synchronization. In that case, protocols that are technically able to carry out such a server initiated synchronization, e.g., TCP/IP or the like, would be used.

Referring now to FIG. 2, the process begins in step 110, where the client 10 identifies a changed record. In step 120, the client 10 dumps the changed record as it exists in the database 12, and transmits that record to the server 20. The changed record is transmitted to the server 20 "as is," or as it exists in the database, i.e., without any conversion into a "standardized" format.

At the server 20, the server 20 receives the changed record and retrieves the data changed in the server database 22 since the last synchronization cycle in step 130. Next, in step 140, the server 20 interprets the received changed record based on the setup information for the client 10. The server 20 preferably resolves any conflicts between the changed record and the retrieved data, such as ID mapping, via step 150. In step 160, the server 20 updates the server database 22 with the changed record received from the client 10, and in step 170, generates client commands which, when executed, will update the client database 12. The client commands are based on the setup information received from the client 10 or by knowing the client device. These client commands are then transmitted to the client 10, which executes them in step 180 in order to update the client database 12.

The client commands which the server 20 sends to the client 10 to execute could be in a form which requires some interpreter on the client 10, or ideally may be already object code compiled by the server 20 for execution on the client 10. In that case, the client 10 would need a very small daemon or the like which downloads and starts the precompiled object code.

While the amount of the data transferred between the client 10 and the server 20 may be slightly larger than with known methods, increased data transfer rates over wireless, as well as wired, networks can easily accommodate such loads without sacrificing performance. In parallel, the processor power of client devices 10 will increase moderately, therefore transferring data over wireless networks will be much cheaper in comparison with the costs of memory and processing power in client devices.

Through aspects of the method and system of the present invention, the amount of software required for synchronization in the client 10 is dramatically reduced. This makes it possible to offer less expensive client devices with less memory, or allows the client device to utilize available memory for alternative applications. The method and system of the present invention, in essence, transfers the synchronization workload from the client 10 to the server 20, which is better adapted and equipped to handle such a load.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for synchronizing data records stored on a server system with data records stored on a client system, comprising the steps of:

in response to receiving a changed data record from the client system, interpreting the received changed data record based on a client specific setup information provided to the server system by the client system, wherein the client specific setup information enables the server system to select correct methods to generate at least one client specific command that is executable by the client system thereby reducing client system code requirements, wherein the received changed data record is as is and without any conversion into a standardized format;

updating a server database with the received changed data record, wherein any conflicts with the received changed data record are resolved; and transmitting to the client system an executable program comprising the at least one client specific command generated based on the client specific setup information, wherein data synchronization occurs when the executable program is executed by the client system.

2. A method for synchronizing data records stored on a client system with data records stored on a server system, comprising the steps of:

transmitting an identified changed data record to the server system as is and without any conversion into a standardized format, wherein any conflicts with the received changed data record are resolved by the server system;

receiving an executable program comprising at least one client specific command generated and transmitted by the server system based on a client specific setup information provided to the server system by the client system, wherein the client specific setup information enables the server system to select correct methods to generate the at least one client specific command that is executable by the client system thereby reducing client system code requirements; and executing the executable program for data synchronization.

3. A non-transitory computer readable storage medium containing program instructions for synchronizing data records stored on a server system with data records stored on a client system, wherein execution of program instructions by one or more processors of a computer causes the one or more processors to carry out the steps of:

in response to receiving a changed data record from the client system, interpreting the received changed data record based on a client specific setup information provided to the server system by the client system, wherein the client specific setup information enables the server system to select correct methods to generate at least one client specific command that is executable by the client system thereby reducing client system code requirements, wherein the received changed data record is as is and without any conversion into a standardized format;

updating a server database with the received changed data record, wherein any conflicts with the received changed data record are resolved; and transmitting to the client system an executable program comprising the at least one client specific command generated based on the client specific setup information, wherein data synchronization occurs when the executable program is executed by the client system.

4. The method of claim 1, wherein the client specific setup information further describes a format of the data record stored in the client system.

5. The method of claim 1, wherein the client system is one of a mobile phone, a handheld computer, and a personal digital assistant.

6. The method of claim 2, wherein receiving further comprises receiving a compiled program comprising object code executable by the client system for synchronization.

7. The non-transitory computer readable storage medium of claim 3, wherein the client specific setup information further describes a format of the data record stored in the client system.

8. The non-transitory computer readable storage medium of claim 3, wherein the client system is one of a mobile phone, a handheld computer, and a personal digital assistant.

* * * * *